US011847729B2

(12) United States Patent
Macleod et al.

(10) Patent No.: US 11,847,729 B2
(45) Date of Patent: Dec. 19, 2023

(54) REMOTE PRODUCTION COLLABORATION TOOLS

(71) Applicant: Evil Eye Pictures, LLC, Berkeley, CA (US)

(72) Inventors: Alastair Macleod, Marina Del Rey, CA (US); Andrew Michael Angulo, Van Nuys, CA (US); Matthew Keith McDonald, Pacifica, CA (US); Patrick Thomas Osborne, Studio City, CA (US); Arnold Joseph Riebli, III, Sonoma, CA (US); James Paul Ritts, Los Angeles, CA (US); Daniel P Rosen, Oakland, CA (US); Justin Schubert, Concord, CA (US); Yovel Schwartz, San Francisco, CA (US); Brian William Smith, St. Germain en Laye (FR)

(73) Assignee: Evil Eye Pictures LLC, Berkeley, CA (US)

( * ) Notice: Subject to any disclaimer, the term of this patent is extended or adjusted under 35 U.S.C. 154(b) by 115 days.

(21) Appl. No.: 17/505,161

(22) Filed: Oct. 19, 2021

(65) Prior Publication Data

US 2023/0119330 A1 Apr. 20, 2023

(51) Int. Cl.
  *G06T 13/80* (2011.01)
  *G06V 40/20* (2022.01)
  *G06V 40/16* (2022.01)

(52) U.S. Cl.
  CPC ............ *G06T 13/80* (2013.01); *G06V 40/165* (2022.01); *G06V 40/166* (2022.01); *G06V 40/23* (2022.01)

(58) Field of Classification Search
  None
  See application file for complete search history.

(56) References Cited

U.S. PATENT DOCUMENTS

| 2019/0043240 A1 | 2/2019 | Finegold |
| 2019/0122410 A1 | 4/2019 | Chamdani et al. |
| 2020/0090391 A1* | 3/2020 | Presley ............... G06T 11/60 |
| 2021/0142818 A1 | 5/2021 | Edwards et al. |

OTHER PUBLICATIONS

USPTO, Written Opinion for International Patent Application No. PCT/US2022/045361, dated Jan. 31, 2023, 10 pages.
USPTO, International Search Report for International Patent Application No. PCT/US2022/045361, dated Jan. 31, 2023, 2 pages.

* cited by examiner

*Primary Examiner* — Peter Hoang
(74) *Attorney, Agent, or Firm* — IP Spring

(57) ABSTRACT

Implementations described herein relate to methods, systems, and computer-readable media for remote production collaboration tools. The remote production collaboration tools can include one or more client devices, a server providing a single connection point, and an animation server configured to produce an animated production. The one or more client devices may provide motion capture data, audio data, control data, and/or associated timestamps. The animation server is configured to process the motion capture data, audio data, control data, and/or the associated timestamps and create the animated production. The animated production may be transmitted as a video stream.

20 Claims, 8 Drawing Sheets

REMOTE PRODUCTION COLLABORATION TOOLS

TECHNICAL FIELD

Embodiments relate generally to production of media, and more particularly, to methods, systems, and computer readable media for remote production collaboration tools.

BACKGROUND

Production and post-production activities are reliant on a relatively large number of persons communicating, congregating, and assisting in production and post-production activities. In animated picture production, artists, actors, directors, and other persons are also required to perform in a collaborative environment to ensure appropriate voice and motion capture activities are completed and that scheduling conflicts are reduced or minimized.

SUMMARY

Implementations of this application relate to computer-implemented, remote production collaboration tools.

According to one aspect, a real-time media production system is provided. The system can comprise: a server configured to provide a single connection point for receipt of data from one or more client devices; and an animation server in operative communication with the server over a network, the animation server configured to process data aggregated from the single connection point and to create an animation production with a real-time media engine based on the aggregated data and an animation template. The animation server is configured to perform operations comprising: receiving motion capture data from the single connection point, the motion capture data representing a pose of a person and with reference to motion capture timestamps; receiving audio data from the single connection point, the audio data being audio recorded from the person and with reference to audio timestamps; receiving control data from the single connection point, the control data having control events with reference to the control data timestamps; extracting animation cues from the animation template; synchronizing the motion capture data and the audio data based on the motion capture timestamps, the audio timestamps, and the control data timestamps to obtain synchronized data, wherein the synchronized data includes at least a portion that is based on the motion and audio of the person; and providing the synchronized data and the animation cues to the real-time media engine.

Various implementations of the system are described.

According to one implementation, the operations further comprise: assembling the animation production from the synchronized data at the animation server; and outputting the animation production as a video stream from the animation server.

According to one implementation, the motion capture data and the audio data are received at the single connection point from at least one of the one or more client devices.

According to one implementation, the one or more client devices are configured to execute a motion capture application and to perform operations comprising: extracting a portion of the animation template comprising an avatar; presenting a graphical user interface (GUI) having a view pane for feedback and one or more control elements; capturing video data representative of at least a portion of the person's face; converting the video data into the motion capture data with the motion capture application; recording audio data; timestamping the motion capture data and the audio data; presenting an animated avatar in the GUI based on the motion capture data as live feedback in the view pane during the capturing; and transmitting the motion capture data, audio data, motion capture timestamps, and audio timestamps to the single connection point over the network.

According to one implementation, the operations performed by the one or more client devices further comprise: receiving user input through the one or more control elements; assigning one or more control timestamps to the received user input; and transmitting the received user input and the one or more control timestamps to the single connection point.

According to one implementation, the synchronized data further comprises the received user input, and wherein the received user input is indicative of one or more control events including but not limited to animation cues, lighting cues, camera cues, and scene transition cues.

According to one implementation, at least one of the one or more client devices is configured to execute a production control application and to perform additional operations comprising: presenting a graphical user interface (GUI) having a view pane for feedback and one or more control elements; receiving control input through the one or more control elements; assigning one or more control timestamps to the received control input; and transmitting the received control input and the control timestamps to the single connection point, wherein the synchronized data further comprises the received control input.

According to one implementation, the received control input includes input to control features comprising one or more of: a virtual camera; virtual lighting; canned animation sequences; scene transitions; virtual environments; virtual props; or virtual audio.

According to one implementation, the animation server is a first animation server, and wherein the system further comprises one or more animation servers in operative communication with the server, the additional animation servers configured to process data aggregated from the single connection point and to create additional streamable animated productions.

According to one implementation, the motion capture data comprises Facial Action Coding System poses of the person's face.

According to one implementation, the motion capture data further comprises motion capture data of the person's body.

According to one implementation, the animation server is a first animation server, and wherein the system further comprises a plurality of animation servers in operative communication with the server, the plurality of animation servers configured to process data aggregated from the single connection point.

In another aspect, a computer-implemented method of real-time media production is provided. The method can comprise: receiving motion capture data from a single connection point provided by a server, the motion capture data describing motion or a pose of a person and with reference to motion capture timestamps; receiving audio data from the single connection point, the audio data being audio recorded from the person and with reference to audio timestamps; extracting animation cues from an animation template; synchronizing the motion capture data and the audio data based on the motion capture timestamps and the audio timestamps to obtain synchronized data, wherein the synchronized data includes at least a portion that is based on the motion and audio of the person; assembling an animation production from the synchronized data and the animation cues; and outputting the animation production as a video stream.

Various implementations of the method are described.

According to one implementation, the method further comprises: presenting a graphical user interface (GUI) having a view pane for feedback and one or more control elements; capturing video data representative of at least a portion of the person's face; converting the video data into the motion capture data; recording audio data; timestamping the motion capture data and the audio data; presenting an animated avatar in the GUI based on the motion capture data as live feedback in the view pane during the capturing; and transmitting the motion capture data, audio data, motion capture timestamps, and audio timestamps to the single connection point.

According to one implementation, the method further comprises: receiving user input through the one or more control elements; assigning one or more control timestamps to the received user input; and transmitting the received user input and the one or more control timestamps to the single connection point.

According to one implementation, the method further comprises: presenting a graphical user interface (GUI) having a view pane for feedback and one or more control elements; receiving control input through the one or more control elements; assigning one or more control timestamps to the received control input; and transmitting the received control input and the control timestamps to the single connection point, wherein the synchronized data further comprises the received control input.

According to one implementation, the received control input includes input to control features comprising one or more of: a virtual camera; virtual lighting; canned animation sequences; scene transitions; virtual environments; virtual props; or virtual audio.

In another aspect, a real-time media production system is provided. The system can comprise: a server configured to provide a single connection point for receipt of data from one or more client devices; a first client device in operative communication with the server over a network, the first client device configured to execute a motion capture application and to provide audio data and motion capture data to the server; a second client device in operative communication with the server over the network, the second client device configured to execute a production control application and to provide control data to the server; and an animation server in operative communication with the server over the network, the animation server configured to process and aggregate the motion capture data, the audio data, and the control data, and to create an animation production with a real-time media engine based on the aggregated data. The animation server is configured to perform operations comprising: synchronizing the motion capture data, the audio data, and the control data based on motion capture timestamps, audio timestamps, and control timestamps to obtain synchronized data, wherein the synchronized data includes at least a portion that is based on the motion and audio of a person; providing the at least the portion as live feedback to the first client device and the second client device; and assembling the animation production from the synchronized data.

Various implementations of the system are described.

According to one implementation, the first client device is configured to perform operations comprising: presenting a graphical user interface (GUI) having a view pane for feedback and one or more control elements; capturing video data representative of at least a portion of the person's face; converting the video data into the motion capture data with the motion capture application; recording audio data; timestamping the motion capture data and the audio data; presenting an animated avatar in the GUI based on the motion capture data as live feedback in the view pane during the capturing; and transmitting the motion capture data, audio data, motion capture timestamps, and audio timestamps to the single connection point over the network.

According to one implementation, the second client device is configured to perform operations comprising: presenting a graphical user interface (GUI) having a view pane for feedback and one or more control elements; receiving control input through the one or more control elements; assigning one or more control timestamps to the received control input; and transmitting the received control input and the control timestamps to the single connection point.

According to another aspect, a non-transitory computer-readable storage media may be provided. The non-transitory computer-readable medium may contain instructions stored thereon that, responsive to execution by a processing device, causes the processing device to perform operations comprising any of the methodologies and/or functionality of the systems and/or functionality of one or more individual components described herein.

According to yet another aspect, portions, features, and implementation details of the systems, methods, and non-transitory computer-readable media may be combined to form additional aspects, including some aspects which omit and/or modify some or portions of individual components or features, include additional components or features, and/or other modifications; and all such modifications are within the scope of this disclosure.

DETAILED DESCRIPTION

Figure 1:
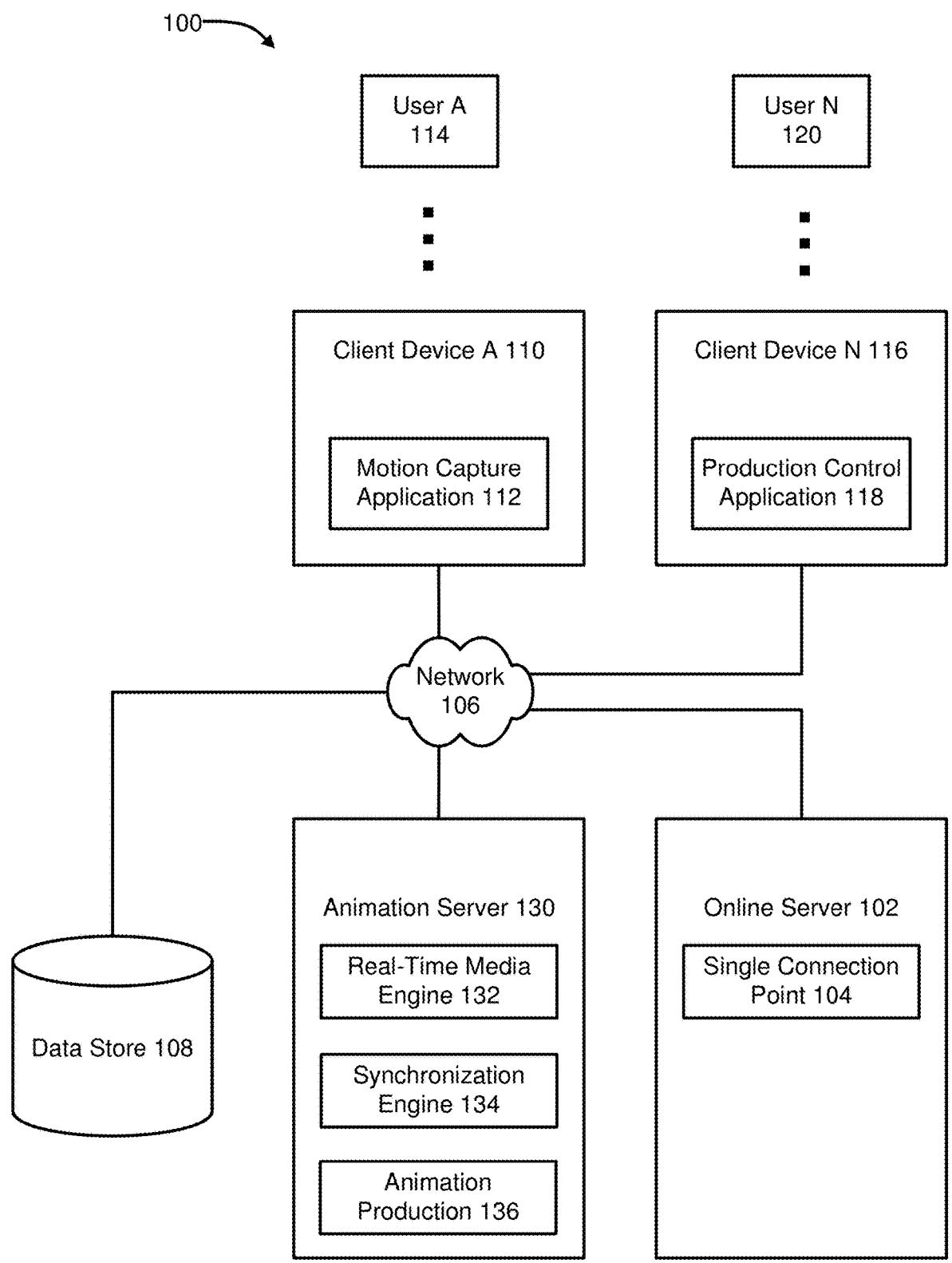
FIG. 1 is a diagram of a simplified network environment for remote production collaboration, in accordance with some implementations.

One or more implementations described herein relate to remote productions, such as animation productions, through an online server having a single connection point for access from the Internet. Features can include aggregating live-captured motion capture data, audio data, and control data, with associated timestamps, synchronizing the aggregated data, and automatically creating an animation production from the synchronized data. The animation production may be a live, streamable video, such that a live performance of a person or persons is captured and transformed into an animated production, as described more fully herein.

Features described herein provide for remote production collaboration tools that streamline and unify a media production process such that the media production process is: efficient, easy-to-use, secure, and malleable. The media production process is effectuated through a plurality of client devices executing software applications including at least a motion capture application and a production control application.

The motion capture application may facilitate the live-capture of video data that may be transformed or translated into motion capture data, as well as audio data, and associated timestamps. A feedback pane is provided through the motion capture application that allows collaboration as well as a view of a portion of the anticipated animation production. The feedback pane may provide live feedback, e.g., while video/audio is being captured.

The production control application may facilitate live-capture of control data such as camera changes, lighting changes, scene transformations, as well as other aspects of a production, in a virtual sense, whereby other persons involved in the production can collaborate with the persons acting, without detracting from the acting. Such directions may be in video, audio, text chat, as well as direct control inputs for use in creating the animation production.

The motion capture data, audio data, and control data are synchronized through an animation server in communication with the single connection point. This synchronized data may be subsequently input into a media engine configured to create the animation production based on the synchronized data and an animation template. In some implementations, the media engine may operate in real-time, e.g., generate the animation production substantially at the same time (e.g., within a short interval such as within one or few seconds) from the capture of audio/video. The animation template provides data associated with animation, such as, for example, characters, avatars, props, buildings, and other virtual elements to construct a scene.

Upon receiving the synchronized data and rendering of a portion of the animation production, a live-stream of the animation production can commence and be distributed over the Internet to a plurality of end-points. The live-stream may also be recorded and/or stored at a database for future distribution after the live-stream terminates. The live-stream may be a refined, final production while the live feedback may be a lightweight representation provided to actors, directors, and other personnel with little to no lag.

Through implementation of the aspects disclosed herein, technical effects and benefits can include, but are not limited to, reduced physical interaction (e.g., all scheduling and interactions for recording an animation may be performed remotely or off-site), improved remote communication (e.g., the motion capture and production control applications include integrated video communications), increased production efficiency (e.g., animation productions can take months whereas aspects disclosed herein provide real-time animation productions, on-the-fly), decreased costs (e.g., less physical structures, stages, and/or props are necessary), as well as other benefits that are apparent to those of ordinary skill in animated production and other art areas.

FIGS. 1-4: System Architecture

FIG. 1 illustrates an example network environment 100, in accordance with some implementations of the disclosure. The network environment 100 is presented as a simplified illustration to aid in understanding foundational aspects of this disclosure. Other network environments, systems, and components are described more fully with reference to other figures herein.

The network environment 100 (also referred to as "system" herein) includes an online server 102, a data store 108, a first client device 110, a second client device 116 (generally referred to as "client devices 110/116" herein), and an animation server 130, all connected via a network 106. The online server 102 can include, among other things, a single connection point 104. The single connection point 104 may be a logical address (e.g., an Internet Protocol (IP) address, logical location identifier, or other address) whereby the client devices 110/116 and the animation server 130 may readily be in operative communication with the online server 102.

The client device 110 can include a motion capture application 112, and the client device 116 can include a production control application 118. Users 114 and 120 can use client devices 110 and 116, respectively, to interact with the online server 102 and with other users utilizing the online server 102 (e.g., directors, other actors, stage hands, etc.).

Network environment 100 is provided for illustration. In some implementations, the network environment 100 may include the same, fewer, more, or different elements configured in the same or different manner as that shown in FIG. 1.

In some implementations, network 106 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In some implementations, the data store 108 may be a non-transitory computer readable memory (e.g., random access memory), a cache, a drive (e.g., a hard drive), a flash drive, a database system, or another type of component or device capable of storing data. The data store 108 may also include multiple storage components (e.g., multiple drives or multiple databases) that may also span multiple computing devices (e.g., multiple server computers).

In some implementations, the online server 102 can include a server having one or more computing devices (e.g., a cloud computing system, a rackmount server, a server computer, cluster of physical servers, virtual server, etc.). In some implementations, a physical server stack may be included in the online server 102, be an independent system, or be part of another system or platform.

In some implementations, the online server 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online server 102 and to provide a user with access to online server 102. The online server 102 may also include a website (e.g., one or more webpages) or application back-end software that may be used to provide a user with access to content provided by online server 102. For example, users 114/120 may access online server 102 using the motion capture application 112/118 on client devices 110/116, respectively.

In some implementations, online server 102 may include a type of video communication network providing connections between users to communicate with other users via the online server 102, where the communication may include voice chat (e.g., synchronous and/or asynchronous voice communication), video chat (e.g., synchronous and/or asynchronous video communication), or text chat (e.g., synchronous and/or asynchronous text-based communication). In some implementations of the disclosure, a "user" may be represented as a single individual.

In some implementations, the animation server 130 can include a server having one or more computing devices (e.g., a cloud computing system, a rackmount server, a server computer, cluster of physical servers, virtual server, etc.). In some implementations, the animation server 130 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the animation server 130 and to provide a user with access to animation server 130.

In some implementations, other collaboration platforms can be used with the features described herein instead of or in addition to online server 102 and/or animation server 130. For example, a video networking platform, animation template platform, remote control platform, messaging platform, creation platform, etc. can be used with the remote production collaboration features such that animation productions may be produced and/or created with little or no physical interaction.

In some implementations, animation production may refer to interaction of one or more actors and/or users (e.g., directors, assistants, etc.) using client devices (e.g., 110 and/or 116), the presentation of live feedback of the interaction on a display or other output device of client devices 110 or 116, as well as the creation of an animated production using these interactions. Furthermore, although referred to as "actors," the terms "avatars," "users," and/or other terms may be used to refer to users engaged with and/or interacting with the platform 100 or specific portions of the animation production.

One or more animation production(s) 136 may be created by the online experience platform. In some implementations, an animation production 136 can include an electronic file that can be executed or loaded using software, firmware or hardware configured to present the animated content (e.g., video) to an entity. In some implementations, a motion capture application 112/118 may be executed and an animation production 136 rendered by a real-time media engine 132. In some implementations, different scenes and/or characters of the animation production 136 may have different executable code (i.e., different code from one another) representative of desired animation characteristics (e.g., color, size, shape, etc.). It is noted that although referred to specifically as "animation," or animation-related, the motion capture application 112/118, animation production 136, and real-time media engine 132 may also be used to create partially live/partially animated productions, theatre productions, stage productions, musical productions, and/or virtually any production where live performances can be digitally captured and translated into physical motion of a different form.

As used herein-above and throughout this disclosure, the term "real-time" refers specifically to occurrences substantially at the same time, (e.g., within a second or few seconds of) capture of audio/video/motion capture data. As such, the real-time media engine 132 refers to a media engine configured to produce output at substantially the same time (e.g., within a second or a few seconds of) as the provided input. In this manner, the real-time media engine 132 operates within a small delay of actual input but in substantially real-time. Other variations may be applicable wherein "real-time" refers to a particular amount of time (e.g., 1 millisecond, several milliseconds, 1 second, several seconds, etc.). Additional variations may also be applicable.

In some implementations, animation productions may have one or more environments (also referred to as scenes) where multiple virtual objects and/or props are inserted during rendering to create a finished production. An example of scene may be a three-dimensional (3D) environment similar to a stage or production area. The one or more scenes of an animation production 136 may be described in the animation template such that motion capture data may be translated into motion, action, and/or other changes of avatars, props, and other features within the scenes. An example of a scene may include a car interior. A character of the animation production may interact within the car interior with other actors (e.g., or representative avatars, characters, props, etc.) also being rendered therein. Additionally, sounds, theme music, and/or background music may also be rendered such that the scene becomes an immersive representation of a motion picture described by the animation template. In this manner, an entire animation production 136 may be produced using only motion capture data, audio data, and control data by the animation server 130 and/or real-time media engine 132.

In some implementations, the online server 102 can host one or more other users and can permit users to interact with the animation production 136 (e.g., trigger scene transitions, mute audio, change camera angles, trigger canned animation sequences, etc.) using a motion capture application 112 and/or production control application 118 of client devices 110/116. Users (e.g., 114 and/or 120) of the online server 102 may communicate, interact with, and/or otherwise collaborate using the platform 100. For example, in generating the animation production 136, users that are not actors or actively acting, can send messages, prompts, and other messages to actors to manipulate and change the final animation production 136. The messages, prompts, and/or other messages may be displayed through the motion capture application 112/production control application 118 such that actors interpret the guidance and implement those desired attributes on-the-fly, similar to a video call with text-chat features.

In some implementations, users may entirely create the animation production 136 using the communication and collaboration features described herein. The communication and collaboration features may be rendered similar to known video communication software to increase intelligibility and limit training for use in the platform 100. The communication and collaboration features may automatically isolate actors' voices for use in the animation production 136, while also muting or isolating from the animation production 136. In this manner, users may freely communicate with actors while not worrying about their associated communications interfering with the animation production 136.

For example, user 114 may be an actor creating motion capture data through the motion capture application 112, while user 120 may be a director communicating acting directions through the production control application 118. The actor 114's voice may be captured as audio data for use in the animation production 136 while the director 120's voice would be transmitted only to the motion capture application 112 and not be used in the animation production 136.

In some implementations, props and/or scene objects (e.g., also referred to as "props" or "objects" or "virtual objects" herein) may refer to objects that are used, created, or otherwise depicted in animation production 136. For example, props may include a part, model, character, tools, clothing, buildings, vehicles, flora, fauna, weapons, components of the aforementioned scenes (e.g., windows of a building), and so forth. According to at least one implementation, props and associated placement/movement/behavior may be described in the animation template and/or controlled through the production control application through control input.

The motion capture data, audio data, and/or control input described above may include associated timestamps that delineate a desired time for such data to be used in the animation production 136. This data may then be synchronized, through the synchronization engine 134, and input into the real-time media engine 132 in order to render/create the animation production 136.

It is noted that the online server 102 hosting the single connection point 104 is provided for purposes of illustration, rather than limitation. In some implementations, online server 102 and animation server 130 may be implemented as a single server with multiple software applications executing thereon that provide the functionality described herein. In some implementations there may be multiple servers providing redundant/failover/load balancing capabilities.

As described briefly above, in some implementations the real-time media engine 132 and synchronization engine 134 may be executed through the animation server 130. The real-time media engine 132 can include a game engine used for the development or execution of computer games. For example, real-time media engine 132 may include a rendering engine ("renderer") for 2D, 3D, VR, or AR graphics, a physics engine, a collision detection engine (and collision response), sound engine, audio manager/engine, audio mixers, real-time communication engine, scripting functionality, animation engine, artificial intelligence engine, networking functionality, streaming functionality, memory management functionality, threading functionality, scene graph functionality, lighting, rendering, visual effects, or video support for cinematics, among other features. The components of the real-time media engine 132 may generate commands that help compute and render the animation production 136 (e.g., rendering commands, collision commands, physics commands, etc.) and transform audio (e.g., transform monaural or stereo sounds into individual audio streams with 3D audio placement/spatialization, etc.). In some implementations, motion capture applications 112 and production control applications 118 of client devices 110/116, respectively, may work in collaboration with real-time media engine 132 and the online server 102, such that motion capture data, audio data, and control data is received and stored through data store 108.

In some implementations, the animation server 130, using real-time media engine 132, may perform some or all rendering functions (e.g., generate physics commands, rendering commands, audio commands, scene transition commands, etc.) described in the animation template, or offload some of the rendering functions to an additional real-time media engine 132 at a second and/or separate animation server (not illustrated). In some implementations, each animation production 136 may have a separate, identical or nearly identical copy produced at one or more animation servers arranged as a plurality of animation servers in operative communication with the single connection point 104.

As further described briefly above, users involved in animation production 136 on client devices 110, 117 and 116, and may send control instructions (e.g., user inputs, such as camera angle, trigger canned animation, scene transition, actor selection, or character position and other information, etc.) to the online server 102. Subsequent to receiving the control instructions the online server 102 may send the control instructions to the data store 108. Additionally, motion capture data and audio data captured from actors using the motion capture application 112 may be sent to the data store 108.

The synchronization engine 134 may synchronize the control instructions, motion capture data, and audio data using the associated timestamps. The real-time media engine 132 may input synchronized control instructions, motion capture data, and audio data; and render the animation production 136 for live streaming and/or present a portion as live feedback on the displays of client devices 110 and 116. The client devices 110 and 116 may also use the control instructions to create, modify, and/or otherwise alter the animation production 136 on-the-fly.

In some implementations, the control instructions may refer to instructions that are indicative of an actual media production. For example, control instructions may include input to control features comprising one or more of a virtual camera; virtual lighting; canned animation sequences; scene transitions; virtual environments; virtual props; or virtual audio.

In some implementations, motion capture data refers to Facial Action Coding System (FACS) poses of a person's face. Motion capture data may also refer to motion capture data of a portion or entirety of a person's body.

In some implementations, audio data refers solely to voices and/or audio created by an actor (e.g., huffs, grunts, noises, etc.) for use in the animation production 136. However, other audio data including voice instructions by directors and/or other users may be presented/played back to actors while not being included within the animation production 136.

In some implementations, the client device(s) 110 or 116 may each include computing devices such as personal computers (PCs), mobile devices (e.g., laptops, mobile phones, smart phones, tablet computers, or netbook computers), network-connected televisions, gaming consoles, etc. In some implementations, a client device 110 or 116 may also be referred to as a "user device." In some implementations, one or more client devices 110 or 116 may connect to the online server 102 at any given moment. It may be noted that the number of client devices 110 or 116 is provided as illustration, rather than limitation. In some implementations, any number of client devices 110 or 116 may be used.

In some implementations, each client device 110, 116, and 117 (FIG. 2) may be operable to perform some or all of the functionality of the disclosed motion capture application 112 and the production control application 118. Accordingly, while each client device may be illustrated as performing particular functions, other functionality of other client devices may be combined at a single client device rather than remain separate, in some implementations.

In some implementations, each client device 110 or 116 may include an instance of the motion capture application 112 or the production control application 118, respectively. In one example, the applications 112/118 may allow users to interact with one another in a video-chat-like environment. Additionally, the applications 1102/118 may be a native application (e.g., a mobile application, app, or a video chat program) that is installed and executes local to client device 110 or 116 and allows users to interact with online server 102. The video chat application may render, display, or present the content (e.g., a web page, a user interface, a media viewer, an audio stream) to a user. In an implementation, the video chat application may also include an embedded media player that is embedded within a user interface to allow live feedback of a portion of the animation production 136.

According to aspects of the disclosure, the applications 1102/118 may be an online collaboration platform application for users to act, edit, and upload motion capture and/or audio to the online server 102 as well as interact with online server 102 (e.g., discuss scenes and/or other production attributes). As such, the applications 1102/118 may be provided to the client device 110 or 116 by the online server 102. In another example, the applications 1102/118 may be an application that is downloaded from a server.

In some implementations, a user may log in to online server 102 via the applications 112/118. The user may access a user account by providing user account information (e.g., username and password) where the user account is associated with an animation production to be produced using online server 102 (and ostensibly, the animation server 130).

In general, functions described as being performed by the online server 102 and/or animation server 130 can also be performed by the client device(s) 110 or 116, or an additional server, in other implementations if appropriate. In addition, the functionality attributed to a particular component can be performed by different or multiple components operating together. The online server 102 can also be accessed as a service provided to other systems or devices through appropriate application programming interfaces (APIs), and thus is not limited to use in websites.

Hereinafter, operation of the online server 102 and animation server 130, with regard to creating the animation production 136, utilizing the real-time media engine 132, is described more fully with reference to FIG. 2.

Figure 2:
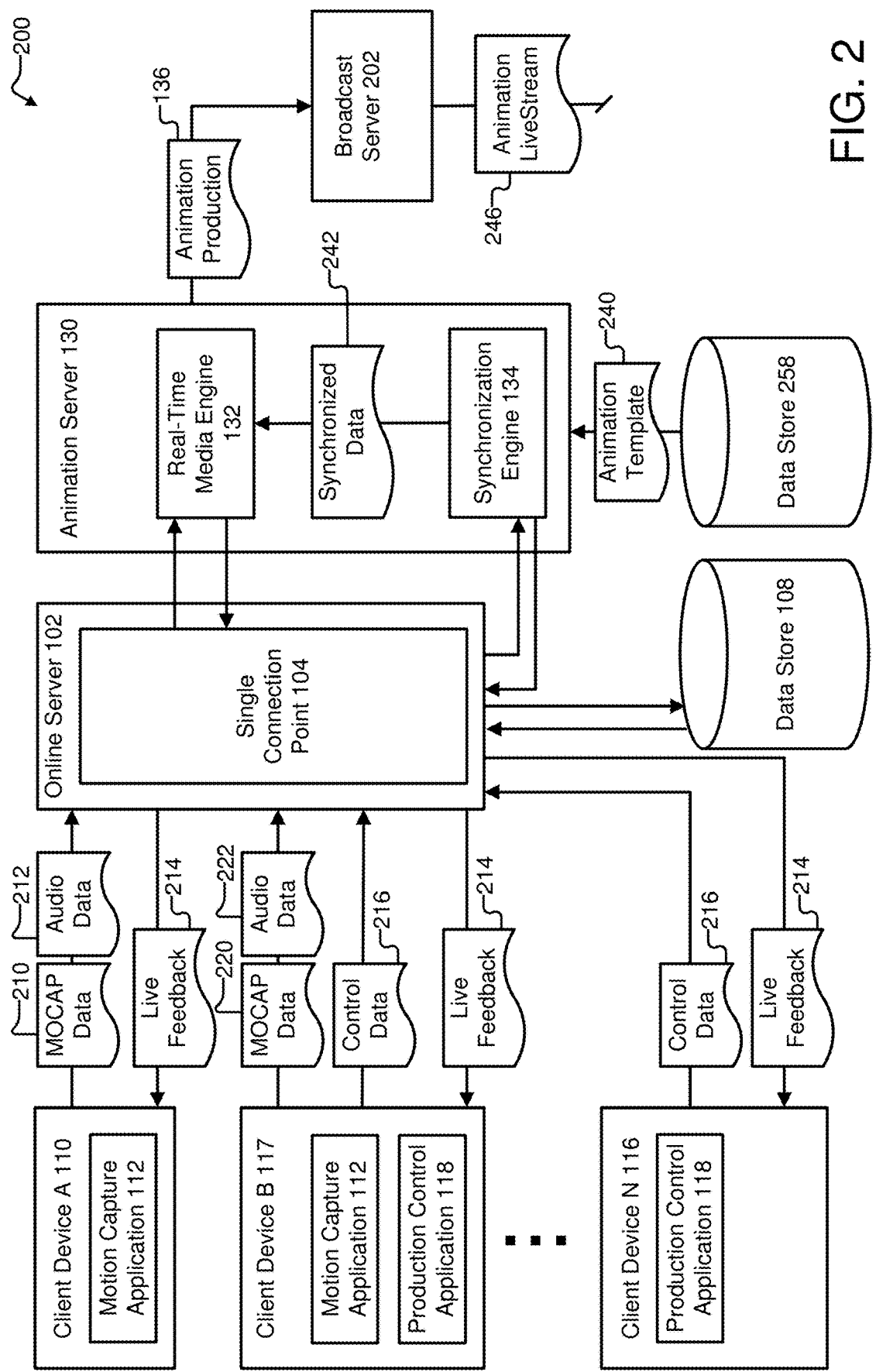
FIG. 2 is a diagram of an example network environment for remote production collaboration, in accordance with some implementations

FIG. 2 is a diagram of an example network environment 200 (e.g., a more detailed view of the network environment 100) for providing remote production collaboration tools. Network environment 200 is provided for illustration. In some implementations, the network environment 200 may include the same, fewer, more, or different elements configured in the same or different manner as that shown in FIG. 2.

As shown in FIG. 2, the online server 102 may be in communication with client device 110 (e.g., executing a motion capture application), client device 117 (e.g., executing both a motion capture application and a production control application), client device 116 (e.g., executing a production control application), data store 108, animation server 130, and broadcast server 202 (e.g., over network 106, not illustrated). It is noted that exhaustive description of those components already described above is omitted herein for the sake of brevity.

The broadcast server 202 is a server configured to connect and communication video streams (or other data) between components of the network environment 200 and across the Internet. The broadcast server 202 may facilitate real-time communication, for example, between client devices and the animation server 130, such that the animation production 136 may be distributed to viewing entities anywhere on the Internet as a live video stream.

As illustrated, the motion capture application 112 of client device 110 may present a graphical user interface (GUI) of a video-chat-like environment. Using the video-chat-like environment, a user of the client device 110 may produce both motion capture data (e.g., MOCAP data) 210 and audio data 212. The MOCAP data 210 may be timestamped at the motion capture application 112 with motion capture timestamps delineating when a particular action is/was performed by the actor/user.

For example, as a video is captured of the actor's face (or a portion or entirety of a body, in some examples), the MOCAP data is extracted. The MOCAP data 210 may be extracted through video analysis in an automated fashion using one or more application programming interfaces (APIs) available through an operating system or software associated with a camera device on the client device 110. In at least one implementation, the one or more APIs are provided by the manufacturer of the client device 110 or the camera device included on the client device 110. The one or more API's allow the extraction of facial poses, lip movement, brow movement, facial features, cheek movement, breathing, fluctuation in physical features, and other similar MOCAP data.

One non-limiting examples of the one or more APIs may include the APPLE ARKit API available on IOS devices from APPLE, INC. Other non-limiting examples of the one or more APIs can include any suitable API capable of translating video data into at least partially coherent motion capture data of at least an actor's mouth, or a VICON motion capture system capable of translation of the body motions of a performer into motion capture data representing the performers body motions Similarly, an audio capture device, such as a microphone or multiple microphones, of the client device 110 may be used to capture the actor's voice to create audio data 212.

The MOCAP data 210 and audio data 212 may be transmitted to the single connection point 104 of the online server 102. The online server 102 may transmit and store the MOCAP data 210 and audio data 212 at a data store, e.g., such as the data store 108 or another data storage device. Associated timestamps for the MOCAP data 210 and audio data 212 are also stored at the data store 108.

Similarly to the above description, a second user of client device 117 may also create additional MOCAP data 220 and audio data 222 for transmission to the single connection point 104 of the online server 102. The online server 102 may transmit and store the MOCAP data 220, audio data 222, and associated timestamps at the data store 108.

Subsequently, or at substantially the same time, the animation server 130 may retrieve and process an animation template 240 from a data store 258. The data store 108 and the data store 258 may be arranged similarly, or differently, depending upon the desired implementation. Furthermore, multiple storage devices may be associated with multiple servers, or vice versa. Moreover, according to one implementation, there may be a 1:1 correspondence between the animation service 130 and its associated storage device 258. For example, in scenarios where a plurality of animation servers are implemented (e.g., multiple instances of the animation server 130), there may similarly be multiple instances of the data store 258. Even further, according to one implementation, in scenarios where a plurality of animation servers are implemented, there may be a shared storage device (e.g., data store 258) shared between the plurality of animation servers or a subset of animation servers. However, it is noted that while multiple animation servers or servers in general may be implemented, the single connection point 104 may be the single connection point provided in each of such implementations. All such modifications are considered to be within the scope of this disclosure.

The animation template 240 may include all representative data for the animation production 136 encoded in computer-readable code segments for driving the real-time media engine 132 to render a scene, portions of a scene(s), and/or the entirety of the animation production 136. The components of the animation template may include, but are not limited to: character avatars, environments, props, physics engine, lighting/rendering, visual effects, sound mixing, spatial audio processing, animation cue management (state machine), scene transitions, camera effects (e.g., lens flare and chromatic aberration), virtual cameras and any other elements or technology required to produce the animation production 136. Other components of the animation template may include, but are not limited to: coding scripts, program logic (e.g., to direct animation cues), and other instructions or programmatic features. For example, if a character wants door to open, the door must be coded to "open" when an associated avatar approaches within the scene. Similarly, a car or motorcycle being driven in a scene would have motion coded based on an algorithm. Other coding, scripts, program logic, programmatic phrases, and other instructions may also be included as a portion of the animation template 240.

The real-time media engine 132 (or a separate application executing on the animation server 130) may extract a portion of the anticipated animation production 136 from the animation template. According to one implementation, the extracted portion may be a character avatar of a character in the animation production 136 that is an avatar representation of users of client devices 110/117. The extracted portion may also be a non-human character, prop, or other animated character. In another implementation, the extracted portion may be a lightweight avatar, a hard-coded avatar, 3D mesh, or other representation of a character of the animation production 136. The extracted portion, e.g., the avatar, may be rendered according to the MOCAP data 210, MOCAP data 220, audio data 212, and audio data 222, control data 216 at client devices 110/117/116 as live feedback 214. This live feedback may represent a visual animation that is played back to actors, directors and other users such that a look-and-feel of the anticipated animation production is immediately provided. There is low or limited lag in providing the live feedback 214 such that the actors and other users may have a relatively immediate view of what the animation production 136 will look like. This relatively immediate view of the live feedback is beneficial to actors and indeed the production in general. For example, through provision of the relatively immediate view, an actor can perceive changes in the avatar representation and/or scene to allow for the actor can react, act, and understand the greater context of the piece or scene as a whole.

It is noted that although described as being presented by the animation server 130, the client devices 110/117 may also render the live feedback 214 directly on client devices 110/117 using the MOCAP data 210 and 220, without being transmitted from the animation server 130. In this example, the live feedback 214 is in the form of a hardcoded or otherwise retrieved avatar description, and the animation and/or rendering of the avatar description is handled directly on the client device 110/117, respectively.

As further illustrated, control data 216 may be captured through client devices 117 and 116 through associated production control applications 118 executing thereon. The control data 216 may be similar to the control inputs described above. The control inputs may be presented on a GUI that is arranged similar to typical media production controls (e.g., sliders, radio buttons, switches, etc.) such that the look-and-feel of the virtual controls mimics typical production control equipment. The control data 216 may include control timestamps delineating a time at which the control action should take place. The control input may be a physical device (e.g. midi control surface).

The client devices 117/116 may transmit the control data 216, and associated timestamps, to the single connection point 104 of the online server 102. Thereafter, the online server 102 may store the control data 216 and associated timestamps at the data store 108.

While the MOCAP data 210/220, audio data 212/222, control data 216, and associated timestamps are being captured, the synchronization engine may be operative to aggregate and synchronize said data. The synchronization may occur after a user-configurable time delay (e.g., a synchronization delay) such that temporal/communication fluctuations are taken into account, and adjustments to the animation production 136 may occur on-the-fly. In this manner, the synchronization engine 134 inputs the live mocap data 210/220 and live control data 216, replay of data stored data from the data store 108, and produces synchronized data 242 for input into the real-time media engine 132.

The real-time media engine 132 receives the synchronized data 242 (including all MOCAP data 210/220, audio data 212/222, control data 216, and timestamps), and begins to render the animated production 136 as a video stream. The video stream includes a motion picture presentation based on the animation template 240 and all synchronized data 242. In general, as the real-time media engine 132 may take as input control instructions in a similar manner as a player interacts with a video game, the animation template may present these control instructions for rendering different scenes, manipulating characters, props, etc., in a similar manner to a video game being played. Furthermore, character motion and fluctuations may be dictated by the MOCAP data 210/220. Furthermore, character voices and other sounds may be driven by the audio data 212/222. Moreover, scene transitions, additional animations, and other attributes may be driven by the control data 216. In this manner, the rendering may be produced on-the-fly, in a live or substantially live manner (including the synchronization delay). This rendering may be recorded as a video stream for transmission to the broadcast server 202.

The video stream is transmitted to the broadcast server 202 and distributed as an animation livestream 246 on the Internet.

As described above, the platform 200 (and 100) may include remote production collaboration tools that facilitate the capture of motion capture data, audio data, and control data, establish associated timestamps, store the data, and present the data to a real-time media engine for rendering into a finalized animation production. The capturing of data is facilitated through a motion capture application and a production control application executing on one or more client devices.

Hereinafter, capture of motion capture data and audio data, utilizing the motion capture application 112, is described more fully with reference to FIG. 3.

Figure 3:
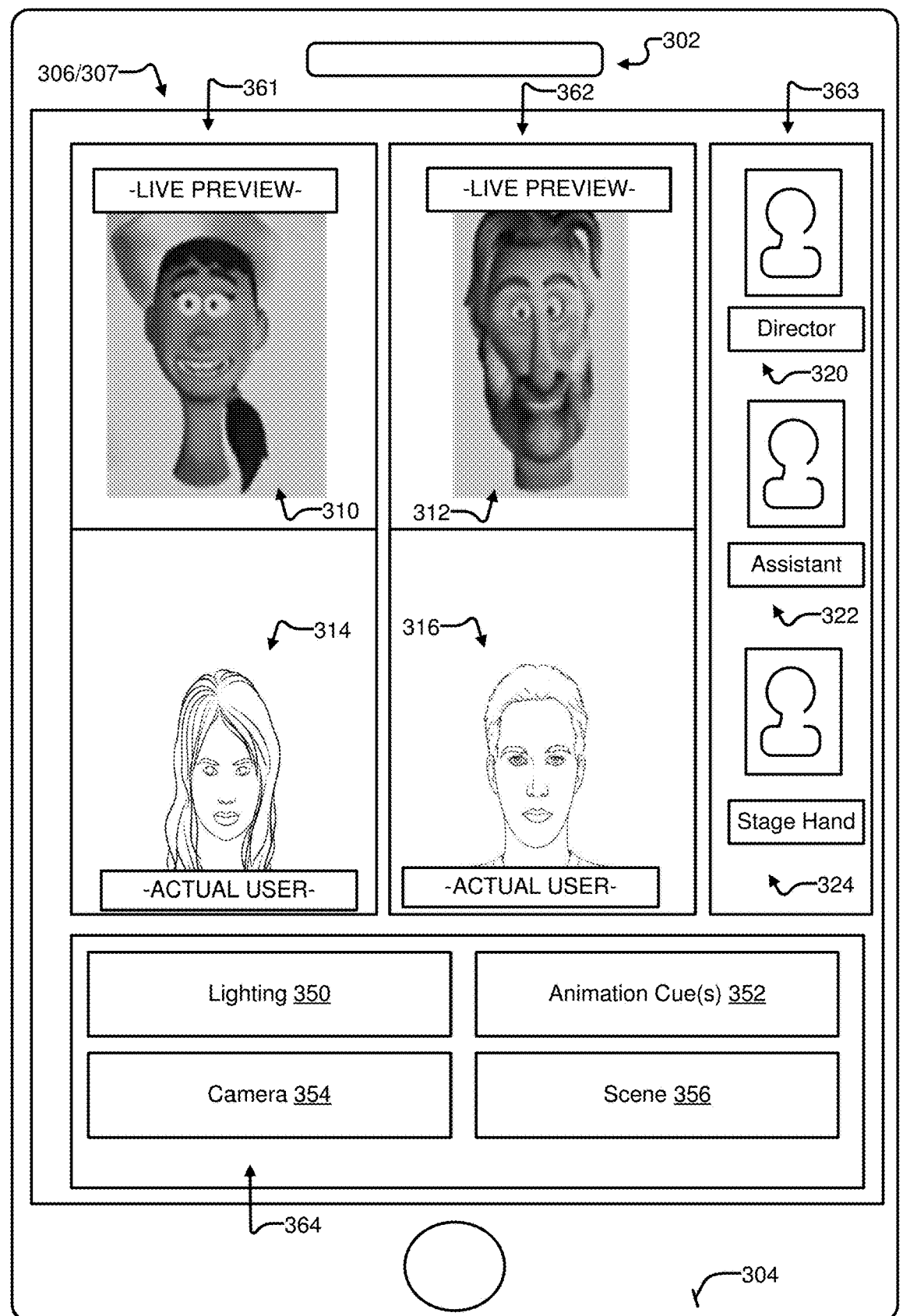
FIG. 3 is a schematic of an example motion capture application and graphical user interface, in accordance with some implementations.

FIG. 3 is a schematic 300 of an example motion capture application and graphical user interface, in accordance with some implementations. The schematic 300 is presented for illustrative purposes only. Particular features, graphical elements, and other attributes may be omitted, altered, and/or otherwise changed without departing from the spirit and scope of this disclosure. While presented as a GUI within a personal tablet or smart phone device, any suitable device including a personal computer, laptop, or other computer device are also applicable. Furthermore, although presented in portrait orientation it is readily understood that any orientation or presentation of the elements of the GUI are also applicable.

As illustrated, a client device 110 may include a body 304 having input devices 302 and a display device 306. The input devices 302 can include, for example, at least one camera device and at least one microphone. The display device 306 may be a display screen, touch screen, or other suitable device. The display device 306 may present a GUI 307 comprising a plurality of graphical elements arranged to present a user with animation production information in relatively real-time.

The GUI 307 may include, for example, a preview pane 361 that presents both a preview (e.g., a live preview) of the animated avatar representation of the user 314 (e.g., 310) and an actual video feed of the user's face (or portion or entirety of their body) 314. The preview pane 361 may present the rendered live feedback 310 such that the user can also manipulate their facial position 314 to effectuate changes in the live feedback 310.

As the user speaks and acts for the camera (e.g., 302), the preview pane 361 presents the live feedback 310 and live video 314 in a manner similar to a video chat application being used by two or more users in different locations. Furthermore, a collaboration pane 363 presents live collaboration messages (e.g., video, voice, chat, etc.) such that a plurality of other users 320, 322, and 324 may direct the actor in a meaningful manner. Live Preview 312 is an animated avatar representation of another performer. Live Preview 316 is a video feed of the other performer. Panel 326 is optional or multiple panels 326 may be used to represent multiple other performers.

The user may also manipulate production control elements 364 such that lighting 350, animation cues 352, camera views 354, and/or scene transitions 356 are input as control data. In this manner, while a user is capturing relevant MOCAP and audio data, control data may also be captured. The client device 110, as described with reference to FIG. 2, transmits the captured data to the online server 102 for storage at the data store 108.

In general, the production control application 116 may be presented in a similar manner. Alternatively, the production control application 116 may present different or additional control portions for further control of the animation production 132.

Hereinafter, capture of control data, utilizing the production control application 118, is described more fully with reference to FIG. 4.

Figure 4:
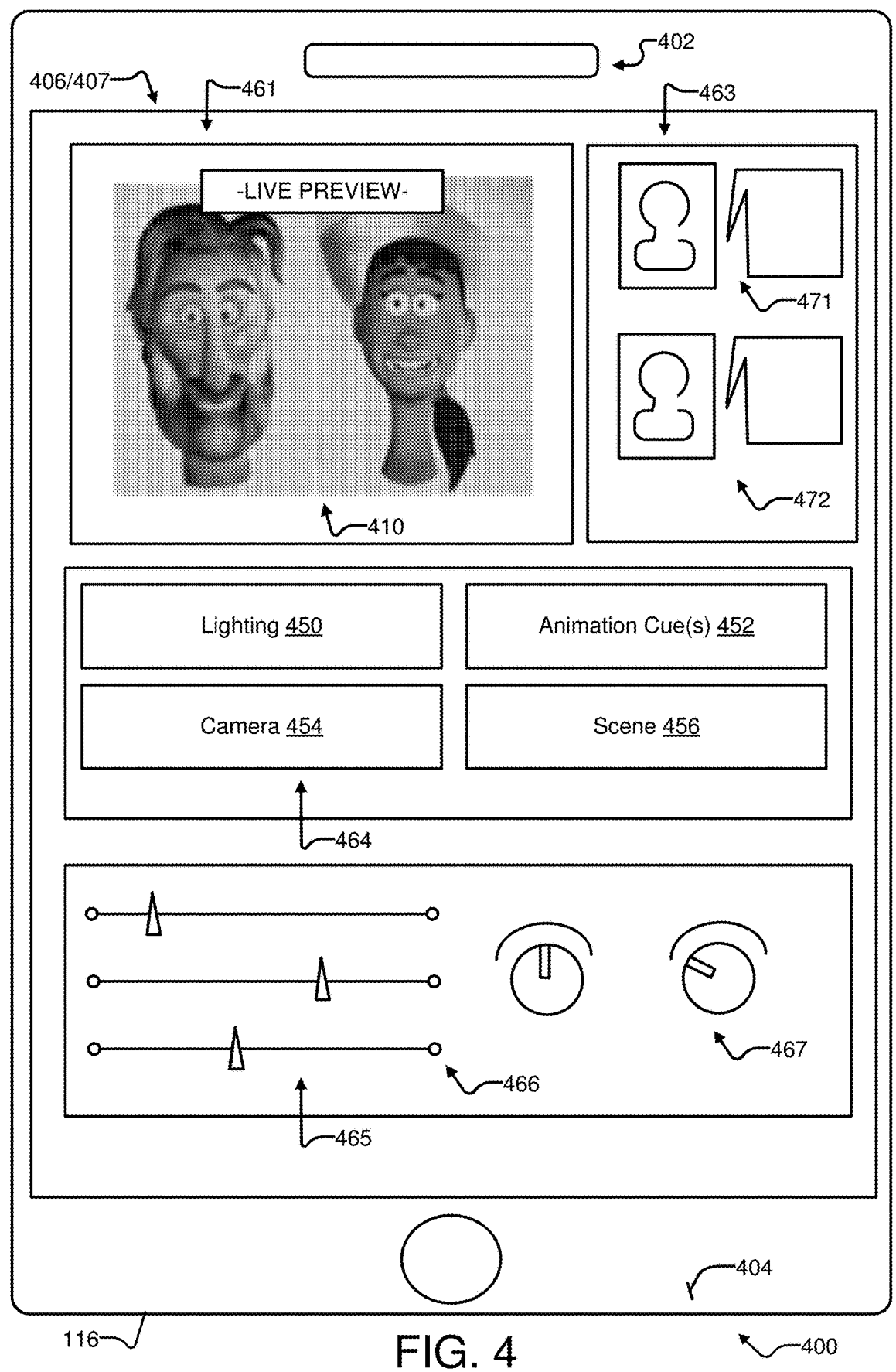
FIG. 4 is a schematic of an example production control application and graphical user interface, in accordance with some implementations.

FIG. 4 is a schematic 400 of an example production control application and graphical user interface, in accordance with some implementations. The schematic 400 is presented for illustrative purposes only. Particular features, graphical elements, and other attributes may be omitted, altered, and/or otherwise changed without departing from the spirit and scope of this disclosure. While presented as a GUI within a personal tablet or smart phone device, any suitable device including a personal computer, laptop, or other computer device are also applicable. Furthermore, although presented in portrait orientation it is readily understood that any orientation or presentation of the elements of the GUI are also applicable.

As illustrated, a client device 116 may include a body 404 having input devices 402 and a display device 406. The input devices 402 can include, for example, at least one camera device and at least one microphone. The display device 406 may be a display screen, touch screen, or other suitable device. The display device 406 may present a GUI 407 comprising a plurality of graphical elements arranged to present a user with animation production information in relatively real-time.

The GUI 407 may include, for example, a live preview pane 461 that presents a preview of one or more animated characters controlled by other users/actors (e.g., 410). The live preview pane 461 may present the rendered live feedback 410 such that the user can track changes in the animation production 132 based on control input issued by the user.

For example, the user may manipulate production control elements 464 and 465 such that lighting 350, animation cues 352, camera views 354, and/or scene transitions 356 are input as control data. Additional controls including sliders 466 and control elements 467 may also be manipulated by the user. Furthermore, although not illustrated, additional controls including external control boards, mixing boards, Musical Instrument Digital Interface (MIDI) controllers, and/or other suitable devices may be interfaced with the device 116 for additional control data to be captured.

In this manner, while a user is viewing relevant live feedback 410, control data may be captured and rendered through the live feedback 410. The client device 116, as described with reference to FIG. 2, transmits the captured data to the online server 102 for storage at the data store 108.

As described above, one or more client devices may be used to capture MOCAP data, audio data, and control data, along with associated timestamps, for use in rendering the animation production 132. Hereinafter, a more detailed description of a method of remote production collaboration, including rendering of a live animation production using the aforementioned features, is presented with reference to FIGS. 5-7.

Figure 5:
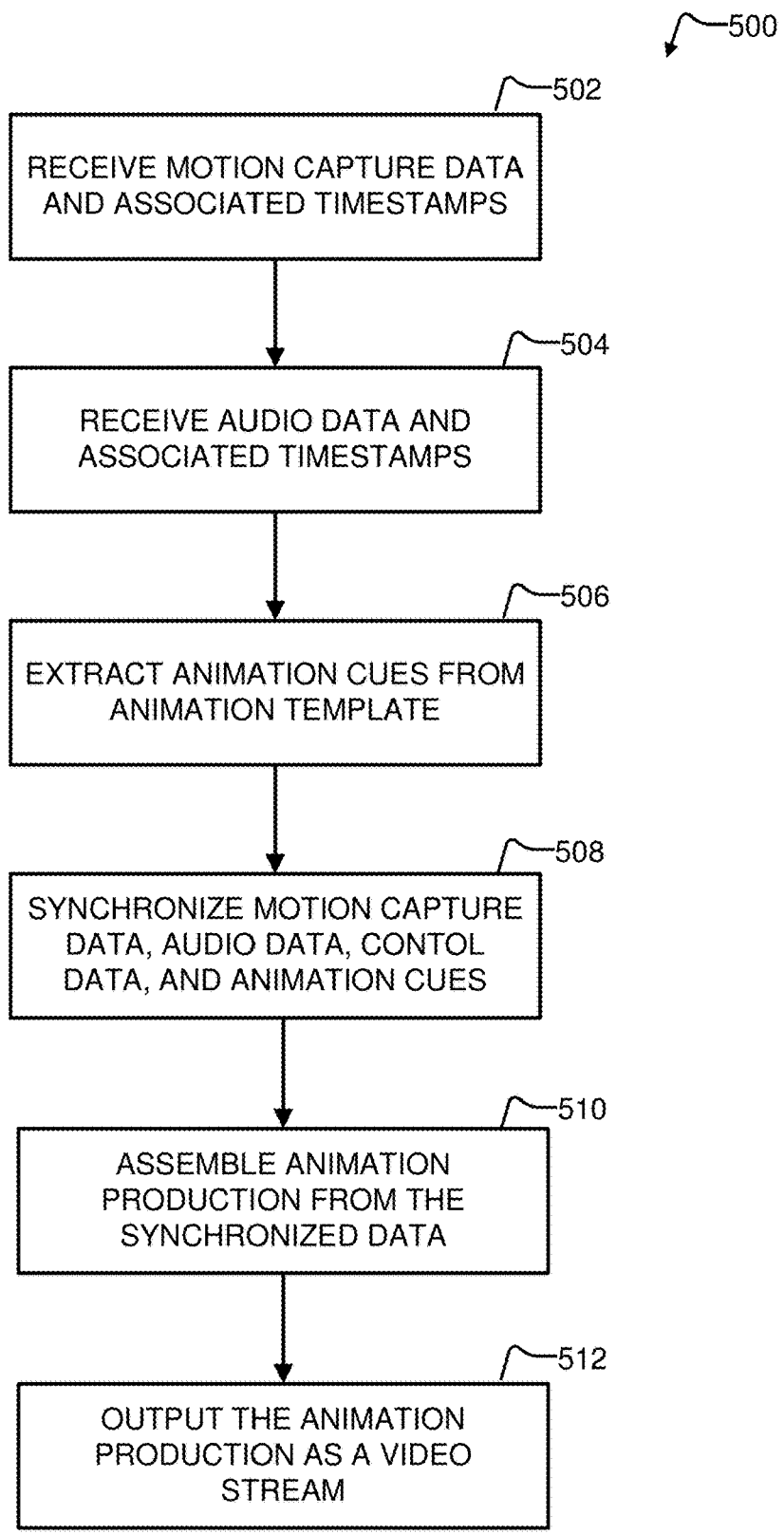
FIG. 5 is a flowchart of an example method of remote production collaboration, in accordance with some implementations.

FIG. 5: Example Method of Remote Production Collaboration

FIG. 5 is a flowchart of an example method 500 of remote production collaboration, in accordance with some implementations. In some implementations, method 500 can be implemented, for example, on a server system, e.g., online server 102 and animation server 130, as shown in FIG. 1. In some implementations, some or all of the method 500 can be implemented on both a server system and one or more client systems. In described examples, the implementing system includes one or more processors or processing circuitry, and one or more storage devices such as a database or other accessible storage. In some implementations, different components of one or more servers and/or clients can perform different blocks or other parts of the method 500.

In some implementations, motion capture, audio/video capture, capture of control input, data transmission, animation generation, and other functionality are all performed with user consent. Furthermore, the user at each client device described can configure various permissions (e.g., capture video but not audio, pause or stop capture) or deny permission entirely (e.g., non-actors may turn off audio/video capture entirely). Furthermore, other configuration options and/or methods to receive user consent prior to recording or capturing data may be included within the below-described implementation of method 500 although not particularly illustrated. Method 500 may begin at block 502.

At block 502, motion capture data and associated timestamps are received. For example, motion capture data (e.g., 210, 220) may be captured through a client device (e.g., 110, 116, and/or 117) and transmitted to the single connection point 104 of the online server 102. Generally, the motion capture data describes the pose of a person at a given time and is in reference to motion capture timestamps that delineate when a particular pose occurs. In at least one implementation, the motion capture data includes Facial Action Coding System poses of a person's face. In an additional implementation, the motion capture data includes motion capture data indicative of motion of a person from about shoulder-height to a top of their head. In additional implementations, the motion capture data includes motion capture data indicative of motion of a person's body, portions of their body, arms, legs, shoulders, and/or other portions of a body. In additional implementations, the motion capture data includes measureable metrics representative of a plurality of user face poses, body poses, and/or motion. Example metrics include any metrics used to quantify facial changes over time, emotions (e.g., happy, angry, etc.), slight motions (e.g., nodding head, eyebrow motion, eyebrow position, eye curl, etc.) and/or any suitable metric representative of poses or motion of a person. Block 502 is followed by block 504.

At block 504, audio data is received. The audio data includes an actor's voice and/or other sounds or noises produced by the actor. The audio data may be transmitted from a client device to the single connection point 104. Furthermore, the audio data can include audio recorded from the person and with reference to audio timestamps. It is noted that while an actor's voice is ostensibly a portion of the audio data, additional audio, such as voice commands from directors and/or other users may also be captured, although not used in the final animation production. In this manner, block 504 includes capturing all audio data presented by a user, extracting or isolating sounds created by an actor and sounds created by other users. The sounds created by the actors are timestamped and stored, while the sounds created by other users are transmitted to client devices for collaboration as described herein. Block 504 is followed by block 506.

At block 506, animation cues are extracted from an animation template (e.g., 240). The animation cues may be computer-executable code segments describing any attribute of an animation production 132 to be rendered. The animation cues may be associated with a particular timeframe, time window, or single reference point in time, such that they can be synchronized with the received audio and motion capture data, subsequently. According to one implementation, the animation cues are computer game input code segments describing physics commands, rendering commands, audio commands, scene transition commands, and other commands that are configured to direct the real-time media engine 132 to render a scene in accordance with the animation template 240. Block 506 is followed by block 508.

At block 508, the motion capture data, the audio data and the control data are synchronized based on the motion capture timestamps, the audio timestamps, and control data timestamps to obtain synchronized data 242. For example, synchronization may be based on an overall time-of-origin compared to the motion capture timestamps, audio timestamps, and control data timestamps. Therefore, the synchronization may be facilitated by aligning each representative timestamp, in order of sequence of occurrence, such that all motion capture data, audio data, and control data is animated in the appropriate sequence and at the appropriate time. The synchronization engine 134 may facilitate this alignment (e.g., synchronization) through use of the overall time-of-origin that is shared by some or all devices of the platform 200, or with another logical value that is established for the devices and that facilitates synchronization. In some implementations, the overall time-of-origin may be obtained from an authoritative source. In some implementations, the overall time-of-origin may be a reference point in time that is read or input by the synchronization engine 134, while the associated timestamps can be delta-change values from the reference point in time. The synchronization engine 134 may therefore use the reference point in time (or origin time) and associated timestamps to appropriately order different MOCAP, audio, and control events to create the synchronized data 242.

The synchronized data includes at least a portion that is based on the motion and audio of the person captured above, and facilitates rendering a live performance animation production as opposed to a video game based on hard-coded commands or synthesized (e.g., Artificial Intelligence) based performances. In this manner, block 508 facilitates the creation of a real media production based on actors performing live within the view of a camera device of the client device. Block 508 is followed by block 510.

At block 510, the animation production 136 is assembled from the synchronized data. For example, the real-time media engine 132 may take the synchronized data and render the animation production 136 using said data, as if rendering a portion of a video game. The synchronization engine 134 may provide the synchronized data 242, in sequence of occurrence, to the real-time media engine 132 such that the real-time media engine 132 outputs a live rending in the appropriate sequence. For example, based on a specific and common timestamp value in the data streams being synchronized, the synchronization engine 134 provides events to be rendered to the real-time media engine 132. In response to these events, the real-time media engine 132 renders the events as animated portions of the production and/or an output video stream. As newly synchronized events are input to the real-time media engine 132, more video is output, and so forth. Thus, through operation and communication between the real-time media engine 132 and the synchronization engine 134, an animated production may be created in real-time. Block 510 is followed by block 512.

At block 512, the animation production 136 is output as a video stream 246 for distribution over the Internet or another network. For example, as described above, as motion capture data, audio data, control data, and animation data are provided, in order, to the real-time media engine 132 by the synchronization engine 134, the animation production 136 is created in an appropriately synchronized manner. The video stream 246 is the output or rendering of these events for viewing by an audience. The video stream 246 may be output and streamed over the Internet or may be transmitted over other mediums to any applicable or capable viewing device, such as any device somewhat similar to the client devices described above. Blocks 502-512 may be combined, repeated and performed in sequence or in parallel, in a different order, according to any desired implementation.

As described above, the real-time media engine 132, using synchronized data 242 provided by the synchronization engine 134, renders a live, animation production for distribution. The live, animation production uses motion capture data, audio data, and control data for controlling aspects of the animation production. Furthermore, animation cues, camera angles, scene transitions, and other attributes may be collaborated upon and provided for further tailoring of the animation production. Hereinafter, methods of capturing motion capture data, audio data, and control data are described with reference to FIGS. 6 and 7.

Figure 6:
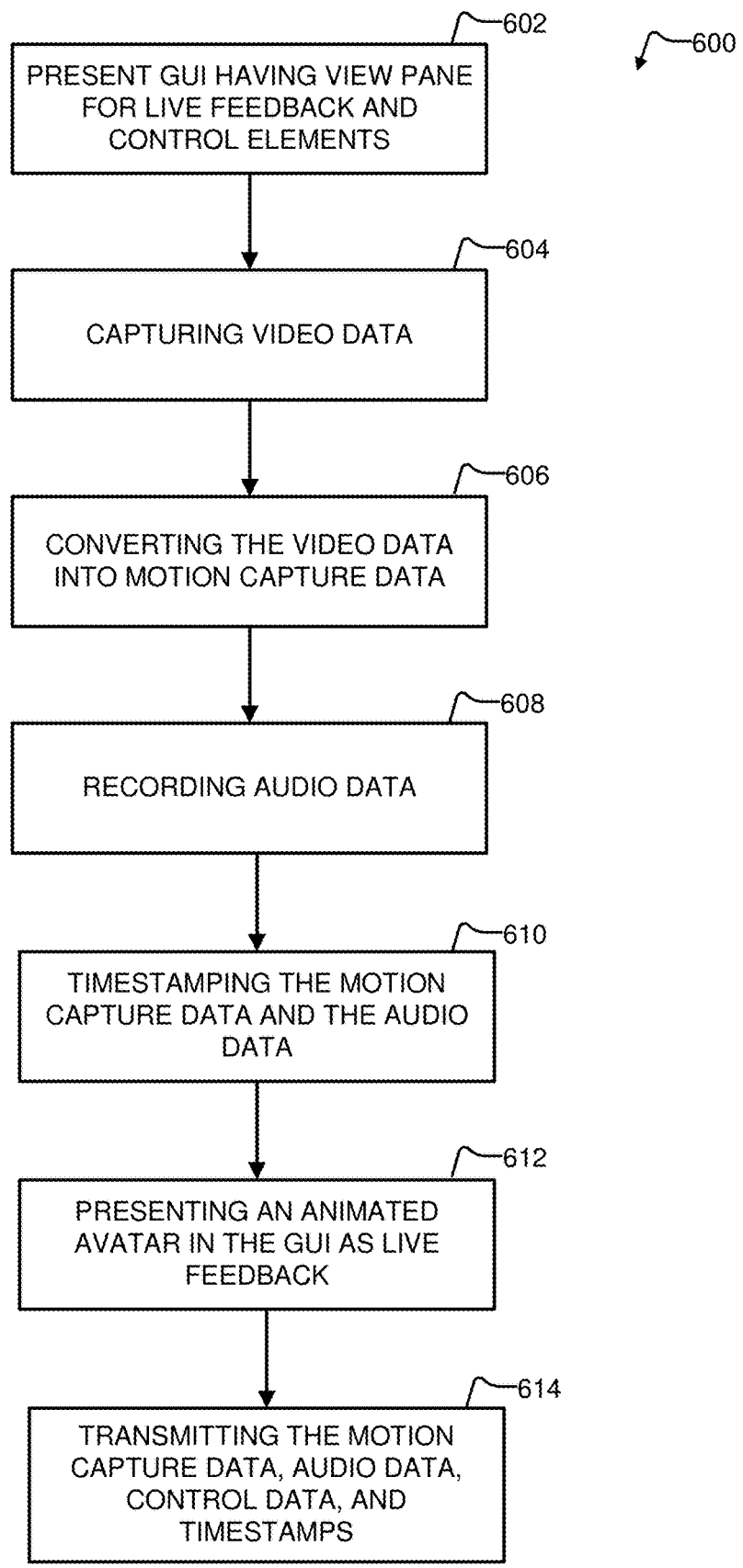
FIG. 6 is a flowchart of an example method of capturing motion capture data and audio data, in accordance with some implementations.

FIG. 6: Example Method to Capture Motion Capture Data and Audio Data

FIG. 6 is a flowchart of an example method 600 to capture motion capture data and audio data, in accordance with some implementations. In some implementations, method 600 can be implemented, for example, on a server system, e.g., online server 102 as shown in FIG. 1. In some implementations, some or all of the method 600 can be implemented on a system such as one or more client devices 110 and 116 as shown in FIG. 1, and/or on both a server system and one or more client systems. In described examples, the implementing system includes one or more processors or processing circuitry, and one or more storage devices such as a database or other accessible storage. In some implementations, different components of one or more servers and/or clients can perform different blocks or other parts of the method 600. Method 600 may begin at block 602.

At block 602, a graphical user interface (GUI) is presented to a user through a client device. The GUI may include a view pane for feedback and one or more control elements presented therein. For example, FIG. 3 illustrates an example motion capture application GUI that includes both live feedback panes and control elements. Block 602 is followed by block 604.

At block 604, video data representative of at least a portion of the person's face is captured. The video data may also be representative of a portion of a person's body. Furthermore, in other implementations, the video data may include video data of puppetry or other props used within the visual field of a camera device on a client device. Block 604 is followed by block 606.

At block 606, the video data is converted into the motion capture data with the motion capture application. For example, motion may be extracted using a supplied API, augmented reality device, virtual reality device, or associated software. The motion may be encoded as facial poses, lip movement, eye movement, brow movement, cheek movement, fluctuations in skin temperature, head movement, shoulder movement, and virtually any other motion that may be captured in the video data. Other movement including body movement and/or prop movement (e.g., if using a puppet or other acting device) may also be extracted from the video data. Block 606 is followed by block 608.

At block 608, audio data is recorded. The audio data may be captured through a microphone or other device, and may include at least an actor's voice. Block 608 is followed by block 610.

At block 610, the motion capture data and the audio data are timestamped. The timestamps may be stored with the motion capture data and the audio data in a customizable data structure that facilitates rapid storage and retrieval of the underlying information. Block 610 is followed by block 612. The timestamp may be obtained from an authoritative source (NTP, GPS, etc.) and may be added to each sample of data that is obtained. For instance if one second of audio is sampled at 44.1 kHz generating 44100 units of sample data, an additional timestamp can be added to the sample representing the time the first sample was taken at. When the next second of data is captured it will have a new timestamp that is one second after the first sample. If the motion capture data represents a set of FACS poses sampled at 60 frames per second. Each sample will consist of values representing the magnitude of the estimated FACS pose and a timestamp that the pose was captured. Any other time sampled data may be captured and transmitted this way; the value of the sample along with the timestamp representing the time that the sample was taken. It is important that all devices that create timestamps use an authoritative source that provides an accurate synchronization between different physical locations (Network Time Protocol, Global Positioning System or physical devices that are brought together for synchronization and then distributed etc.).

At block 612, an animated avatar is presented as live feedback to a user. For example, based on the motion capture data, a rendered animation of at least a portion of a character or avatar may be presented as live feedback in the view pane during the capturing. Such live feedback provides intuitive cues that enable adjusting acting, motion, and voice by the actor to produce a high-quality animation production. The animated avatar may be based on an avatar extracted from the animation template 240, or may be based on hard-coding of a 3D mesh, avatar, or other description that is rendered directly on a client device. Block 612 is followed by block 614.

In block 614, the motion capture data, audio data, motion capture timestamps, and audio timestamps are transmitted to the single connection point over the network. In this manner, a single connection to the online server 102 is used, and the online server 102 may store the motion capture data, audio data, and/or any included control data (as well as associated timestamps) at the data store 108 for use in rendering the animation production 136.

Blocks 602-614 may be combined, repeated and performed in sequence or in parallel, in a different order, according to any desired implementation.

Hereinafter, a more detailed discussion of capturing control data is provided with reference to FIG. 7.

Figure 7:
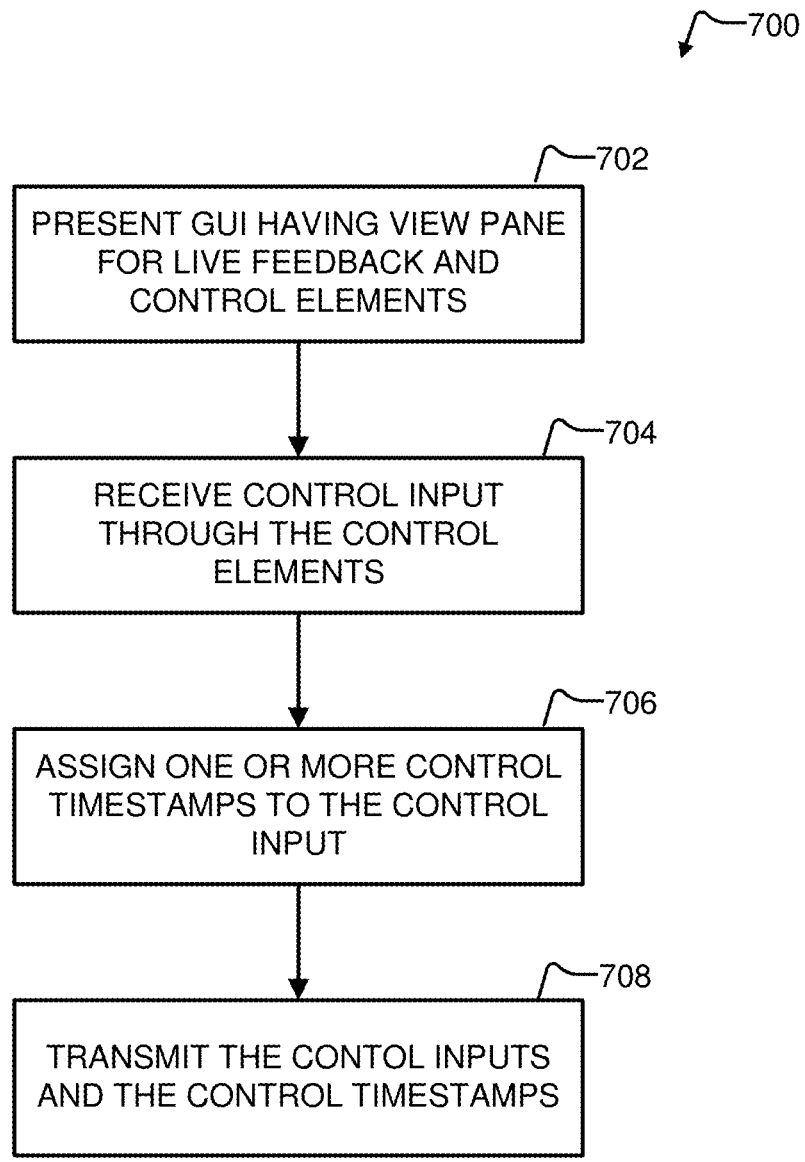
FIG. 7 is a flowchart of an example method of capturing control input data, in accordance with some implementations.

FIG. 7: Example Method to Capture Control Data

FIG. 7 is a flowchart of an example method 700 to capture control data, in accordance with some implementations. In some implementations, method 700 can be implemented, for example, on a server system, e.g., online server 102 as shown in FIG. 1. In some implementations, some or all of the method 700 can be implemented on a system such as one or more client devices 110, 117 and 116 as shown in FIG. 1, and/or on both a server system and one or more client systems. In described examples, the implementing system includes one or more processors or processing circuitry, and one or more storage devices such as a database or other accessible storage. In some implementations, different components of one or more servers and/or clients can perform different blocks or other parts of the method 700. Method 700 may begin at block 702.

At block 702, a graphical user interface (GUI) having a view pane for feedback and one or more control elements is presented at a client device. For example, FIG. 4 illustrates an example production control application GUI that includes both live feedback panes and control elements. Block 702 is followed by block 704.

At block 704, control input is received through the one or more control elements. The control input may also be referred to as control data upon transmission to the server 102 for storage. Block 704 is followed by block 706.

At block 706, one or more control timestamps are assigned to the received control input. For example, and without limitation, while an actor's motion and audio should be captured and timestamped in a rapid manner, control inputs may be delayed or assigned different timestamps. For example, a director may input a control function through the GUI at time A, but may desire the timestamp to occur after an actor finishes speaking. In this example, the director may then select an additional control element delineating when the timestamp should occur. Other alterations are also applicable, and can include sequences of animations, transitions, camera changes, lighting changes, and other changes that may be timestamped at a time different from when the actual input was received. Block 706 is followed by block 708.

At block 708, the received control input and the control timestamps are transmitted to the single connection point 104.

Blocks 702-708 can be performed (or repeated) in a different order than described above and/or one or more blocks can be omitted.

Methods 500, 600, and/or 700 can be performed on a server (e.g., 102 and 130) and/or a client device (e.g., 110 or 116). Furthermore, portions of the methods 500, 600, and 700 may be combined and performed in sequence or in parallel, according to any desired implementation.

As described above, systems, methods, and computer-readable media may provide remote production collaboration tools that streamline and unify a media production process. The media production process is effectuated through a plurality of client devices executing software applications including at least a motion capture application and a production control application.

The motion capture application may facilitate the live-capture of video data that may be transformed or translated into motion capture data, as well as audio data, and associated timestamps. A live feedback pane is provided through the motion capture application that allows collaboration as well as a view of a portion of the anticipated animation production.

The production control application may facilitate live-capture of control data such as camera changes, lighting changes, scene transformations, as well as other aspects of a production, in a virtual sense, whereby other persons involved in the production can collaborate with the persons acting, without detracting from the acting. Such directions may be in video, audio, text chat, as well as direct control inputs for use in creating the animation production.

The motion capture data, audio data, and control data are synchronized through an animation server in communication with the single connection point. This synchronized data may be subsequently input into a real-time media engine configured to create the animation production based on the synchronized data and an animation template. The animation template provides data associated with animation, such as, for example, characters, avatars, props, buildings, and other virtual elements to construct a scene.

Upon receiving the synchronized data and rendering of a portion of the animation production, a live-stream of the animation production can commence and be distributed across the Internet to a plurality of end-points. The live-stream may also be recorded and/or stored at a database for future distribution after the live-stream terminates. The live-stream may be a refined, final production while the live feedback may be a lightweight representation provided to actors, directors, and other personnel with little to no lag.

Through implementation of the aspects disclosed herein, technical effects and benefits can include, but are not limited to, reduced physical interaction (e.g., all scheduling and interactions may be performed remotely or off-site), improved remote communication (e.g., the motion capture and production control applications include integrated video communications), increased production efficiency (e.g., animation productions can take months whereas aspects disclosed herein provide real-time animation productions, on-the-fly), decreased costs (e.g., less physical structures, stages, and/or props are necessary), as well as other benefits that are apparent to those of ordinary skill in animated production and other art areas.

Hereinafter, a more detailed description of various computing devices that may be used to implement different devices illustrated in FIGS. 1-4 is provided with reference to FIG. 8.

Figure 8:
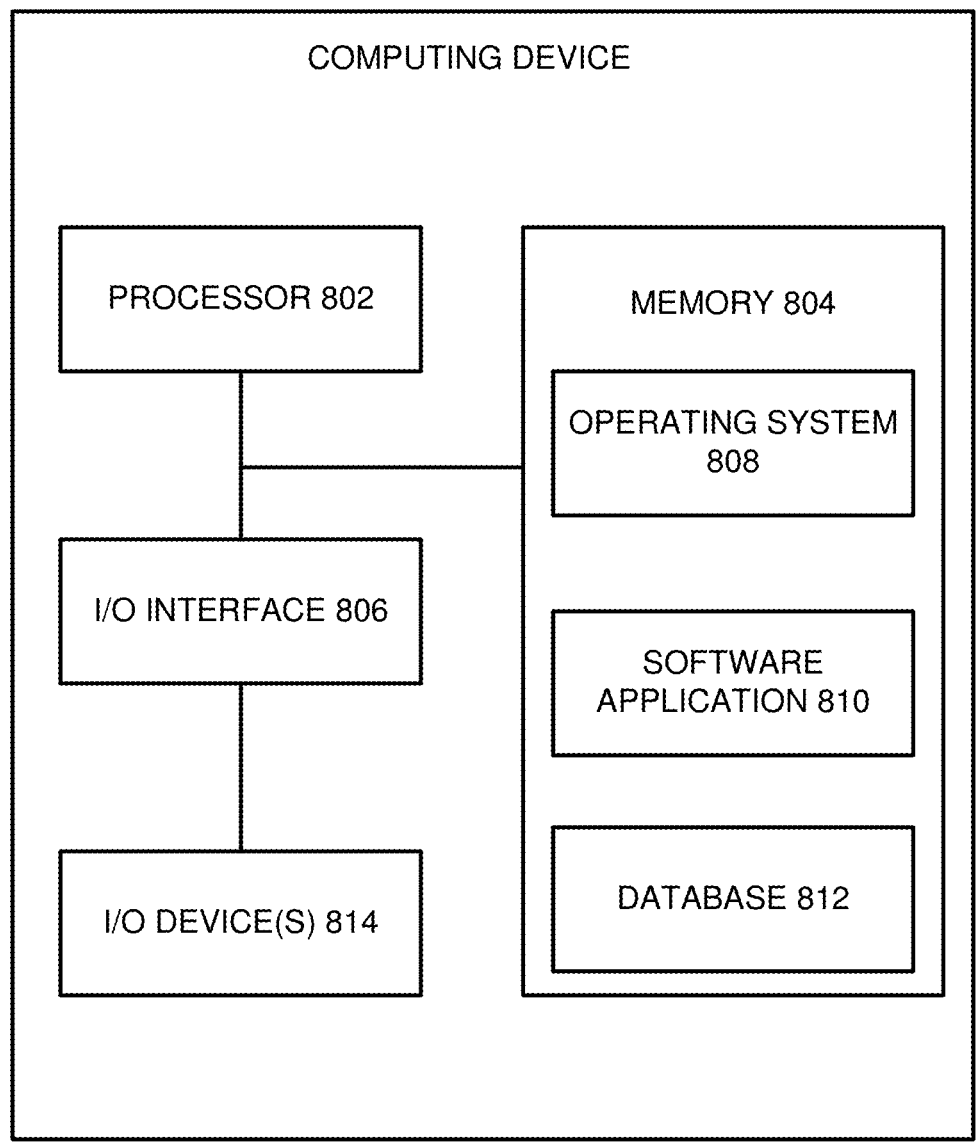
FIG. 8 is a block diagram illustrating an example computing device which may be used to implement one or more features described herein, in accordance with some implementations.

FIG. 8 is a block diagram of an example computing device 800 which may be used to implement one or more features described herein, in accordance with some implementations. In one example, device 800 may be used to implement a computer device, (e.g., 102, 110, 116, and/or 117 of FIG. 1 and FIG. 2), and perform appropriate method implementations described herein. Computing device 800 can be any suitable computer system, server, or other electronic or hardware device. For example, the computing device 800 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 800 includes a processor 802, a memory 804, input/output (I/O) interface 806, and audio/video input/output devices 814 (e.g., display screen, touchscreen, display goggles or glasses, audio speakers, headphones, microphone, etc.).

Processor 802 can be one or more processors and/or processing circuits to execute program code and control basic operations of the device 800. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 804 is typically provided in device 800 for access by the processor 802, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 802 and/or integrated therewith. Memory 804 can store software operating on the server device 800 by the processor 802, including an operating system 808, applications 810 and associated data 812. In some implementations, the applications 810 can include instructions that enable processor 802 to perform the functions described herein, e.g., some or all of the methods of FIGS. 5, 6, and 7.

For example, memory 804 can include software instructions for collaborating in a remote manner for an animated production. Any of software in memory 804 can alternatively be stored on any other suitable storage location or computer-readable medium. In addition, memory 804 (and/ or other connected storage device(s)) can store instructions and data used in the features described herein. Memory 804 and any other type of storage (magnetic disk, optical disk, magnetic tape, or other tangible media) can be considered "storage" or "storage devices."

I/O interface 806 can provide functions to enable interfacing the server device 800 with other systems and devices. For example, network communication devices, storage devices (e.g., memory and/or data store 108), and input/output devices can communicate via interface 806. In some implementations, the I/O interface can connect to interface devices including input devices (keyboard, pointing device, touchscreen, microphone, camera, scanner, etc.) and/or output devices (display device, speaker devices, printer, motor, etc.).

For ease of illustration, FIG. 8 shows one block for each of processor 802, memory 804, I/O interface 806, software blocks 808 and 810, and database 812. These blocks may represent one or more processors or processing circuitries, operating systems, memories, I/O interfaces, applications, and/or software modules. In other implementations, device 800 may not have all of the components shown and/or may have other elements including other types of elements instead of, or in addition to, those shown herein. While the online server 102 and the animation server 130 are described as performing operations as described in some implementations herein, any suitable component or combination of components of online server 102, animation server 130, or similar system, or any suitable processor or processors associated with such a system, may perform the operations described.

A user device can also implement and/or be used with features described herein. Example user devices can be computer devices including some similar components as the device 800, e.g., processor(s) 802, memory 804, and I/O interface 806. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 814, for example, can be connected to (or included in) the device 800 to display images pre- and post-processing as described herein, where such display device can include any suitable display device, e.g., an LCD, LED, or plasma display screen, CRT, television, monitor, touchscreen, 3-D display screen, projector, or other visual display device.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more client devices. In some implementations, one or more methods described herein can be implemented, for example, on a server system, and/or on both a server system and a client system. In some implementations, different components of one or more servers and/or clients can perform different blocks, operations, or other parts of the methods.

One or more methods described herein (e.g., methods 500, 600, and/or 700) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") executing on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the live feedback data for output (e.g., for display). In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A real-time media production system, comprising:
a server configured to provide a single connection point for receipt of data from one or more client devices, wherein the single connection point comprises a logical address that is addressable over a network; and
an animation server in operative communication with the server over the network, the animation server configured to process data aggregated at the single connection point and to create an animation production with a real-time media engine based on the aggregated data and an animation template;
wherein the animation server is configured to perform operations comprising:
receiving motion capture data from the single connection point over the network, the motion capture data representing a pose of a person and with reference to motion capture timestamps, wherein the motion capture data is captured by one of the one or more client devices;
receiving audio data from the single connection point over the network, the audio data being audio recorded from the person and with reference to audio timestamps, wherein the audio data is recorded by one of the one or more client devices;
extracting animation cues from the animation template;
synchronizing, based upon an overall time of origin shared by the animation server, the server, and the one or more client devices, the motion capture data and the audio data based on the motion capture timestamps and the audio timestamps to obtain synchronized data, wherein the synchronized data includes at least a portion that is based on the motion and the audio of the person, and wherein the synchronizing includes a configurable time delay based upon communication fluctuations of the network; and
providing the synchronized data and the animation cues to the real-time media engine.

2. The system of claim 1, wherein the operations further comprise:
assembling the animation production from the synchronized data and the animation cues; and
outputting the animation production as a video stream.

3. The system of claim 1, wherein the motion capture data and the audio data are received at the single connection point from at least one of the one or more client devices.

4. The system of claim 1, wherein the one or more client devices are configured to execute a motion capture application and to perform operations comprising:
presenting a graphical user interface (GUI) that includes a view pane;
capturing video data that includes at least a portion of the person's face;
converting the video data into the motion capture data with the motion capture application;
recording audio data;
presenting an animated avatar in the GUI based on the motion capture data as feedback in the view pane during the capturing; and
transmitting the motion capture data, audio data, motion capture timestamps, and audio timestamps to the single connection point over the network.

5. The system of claim 4, wherein the GUI further includes one or more control elements and wherein the operations performed by the one or more client devices further comprise:
receiving user input through the one or more control elements;
assigning one or more control timestamps to the received user input; and
transmitting the received user input and the one or more control timestamps to the single connection point.

6. The system of claim 5, wherein the synchronized data further comprises the received user input, and wherein the received user input is indicative of one or more animation sequences.

7. The system of claim 1, wherein at least one of the one or more client devices is configured to execute a production control application and to perform operations comprising:
presenting a graphical user interface (GUI) with one or more control elements;
receiving control input through the one or more control elements;
assigning one or more control timestamps to the received control input; and
transmitting the received control input and the control timestamps to the single connection point, wherein the synchronized data further comprises the received control input.

8. The system of claim 7, wherein the received control input includes input to control features comprising one or more of:
virtual character avatars;
a virtual camera;
virtual lighting;
canned animation sequences;
scene transitions;
virtual environments;
virtual props; or
virtual audio.

9. The system of claim 1, wherein the animation server is a first animation server, and wherein the system further comprises a second animation server in operative communication with the server, the second animation server configured to process data aggregated from the single connection point and to create a redundant copy of the animated production.

10. The system of claim 1, wherein the motion capture data comprises Facial Action Coding System (FACS) poses of the person's face.

11. The system of claim 10, wherein the motion capture data further comprises motion capture data of the person's body.

12. The system of claim 1, wherein the animation server is a first animation server of a plurality of animation servers, and wherein the system further comprises the plurality of animation servers in operative communication with the server, the plurality of animation servers configured to process data aggregated from the single connection point and to create additional animated productions.

13. A computer-implemented method of real-time media production, comprising:
receiving motion capture data from a single connection point provided by a server, the motion capture data representing a pose of a person and with reference to motion capture timestamps, wherein the single connection point comprises a logical address that is addressable over a network;

receiving audio data from the single connection point over the network, the audio data being audio recorded from the person and with reference to audio timestamps;

receiving at least a portion of an animation template from the server;

synchronizing, based upon an overall time of origin shared by the server and one or more client devices in communication over the network, the motion capture data and the audio data based on the motion capture timestamps and the audio timestamps to obtain synchronized data, wherein the synchronized data includes at least a portion that is based on the motion and audio of the person, and wherein the synchronizing includes a configurable time delay based upon communication fluctuations of the network;

assembling an animation production from the synchronized data and the at least a portion of the animation template; and outputting the animation production as a video stream.

14. The computer-implemented method of claim 13, further comprising:

presenting a graphical user interface (GUI) having a view pane for feedback;

capturing video data representative of at least a portion of the person's face;

converting the video data into the motion capture data;

recording audio data;

presenting an animated avatar in the GUI based on the motion capture data as feedback in the view pane during the capturing; and transmitting the motion capture data, audio data, motion capture timestamps, and audio timestamps to the single connection point.

15. The computer-implemented method of claim 14, further comprising:

receiving user input through one or more control elements;

assigning one or more control timestamps to the received user input; and transmitting the received user input and the one or more control timestamps to the single connection point.

16. The computer-implemented method of claim 13, further comprising:

presenting a graphical user interface (GUI) having a view pane for feedback and one or more control elements;

receiving control input through the one or more control elements;

assigning one or more control timestamps to the received control input; and transmitting the received control input and the control timestamps to the single connection point, wherein the synchronized data further comprises the received control input.

17. The computer-implemented method of claim 16, wherein the received control input includes input to control features comprising one or more of:

a virtual camera;
virtual lighting;
canned animation sequences;
scene transitions;
virtual environments;
virtual props; or
virtual audio.

18. A real-time media production system, comprising:

a server configured to provide a single connection point for receipt of data from one or more client devices over a network, wherein the single connection point comprises a logical address that is addressable over the network;

a first client device in operative communication with the server over the network, the first client device configured to execute a motion capture application and to provide audio data and motion capture data to the server;

a second client device in operative communication with the server over the network, the second client device configured to execute a production control application and to provide control data to the server; and an animation server in operative communication with the server over the network, the animation server configured to process and aggregate the motion capture data, the audio data, and the control data, and to create an animation production with a real-time media engine based on the aggregated data;

wherein the animation server is configured to perform operations comprising:

synchronizing, based upon an overall time of origin shared by the animation server, the server, the first client device, and the second client device, the motion capture data, the audio data, and the control data based on motion capture timestamps, audio timestamps, and control timestamps to obtain synchronized data, wherein the synchronized data includes at least a portion that is based on the motion and audio of a person, and wherein the synchronizing includes a configurable time delay based upon communication fluctuations of the network;

providing the at least the portion as live feedback to the first client device and the second client device; and assembling the animation production from the synchronized data.

19. The system of claim 18, wherein the first client device is configured to perform operations comprising:

presenting a graphical user interface (GUI) having a view pane for feedback;

capturing video data representative of at least a portion of the person's face;

converting the video data into the motion capture data with the motion capture application;

recording audio data;

timestamping the motion capture data and the audio data;

presenting an animated avatar in the GUI based on the motion capture data as live feedback in the view pane during the capturing; and transmitting the motion capture data, audio data, motion capture timestamps, and audio timestamps to the single connection point over the network.

20. The system of claim 18, wherein the second client device is configured to perform operations comprising:

presenting a graphical user interface (GUI) having a view pane for feedback and one or more control elements;

receiving control input through the one or more control elements;

assigning one or more control timestamps to the received control input; and transmitting the received control input and the control timestamps to the single connection point.

* * * * *